United States Patent [19]
Nagata

[11] Patent Number: 5,946,127
[45] Date of Patent: Aug. 31, 1999

[54] IMAGE PICKUP APPARATUS CAPABLE OF AUTOMATICALLY TRACKING OBJECT

[75] Inventor: Hideki Nagata, Sakai, Japan

[73] Assignee: Minolta Co., Ltd., Osaka, Japan

[21] Appl. No.: 09/069,929

[22] Filed: Apr. 30, 1998

[30] Foreign Application Priority Data

May 12, 1997  [JP]  Japan .................................. 9-121183

[51] Int. Cl.⁶ ................. G02F 1/09; G02B 7/02
[52] U.S. Cl. ............ 359/280; 359/814; 359/822; 359/824; 310/328; 310/90.5
[58] Field of Search ................... 359/280, 813, 359/814, 824, 822; 310/328, 323, 90.5

[56] References Cited

U.S. PATENT DOCUMENTS

| | | | |
|---|---|---|---|
| 4,088,396 | 5/1978 | Edelstein | 359/822 |
| 5,138,496 | 8/1992 | Pong | 359/822 |
| 5,212,673 | 5/1993 | Honda | 359/824 |
| 5,502,598 | 3/1996 | Kimura et al. | 359/814 |
| 5,506,732 | 4/1996 | Mori | 359/824 |
| 5,513,047 | 4/1996 | Matsui | 359/824 |
| 5,589,723 | 12/1996 | Yoshida et al. | 310/328 |
| 5,659,525 | 8/1997 | Miyamae et al. | 359/824 |

OTHER PUBLICATIONS

"Seimitsu Kogaku Kaisha (Precision Engineering Periodical)"; pp. 599–603; vol. 62, No. 4, 1996.

*Primary Examiner*—Loha Ben
*Attorney, Agent, or Firm*—Burns, Doane, Swecker & Mathis, L.L.P.

[57] ABSTRACT

An image pickup apparatus includes an image pickup unit in the form of a hollow ball having an image sensor inside thereof and a lens for focusing an optical image onto the image sensor, a first magnetic member fixedly attached to the image pickup unit, a holder for rotatably holding the image pickup unit, a second magnetic member for magnetically attracting the first magnetic member, and a mover for moving the second magnetic member to thereby rotate the image pickup unit so that the lens orients in a desired direction.

19 Claims, 6 Drawing Sheets

IMAGE PICKUP APPARATUS CAPABLE OF AUTOMATICALLY TRACKING OBJECT

This application is based on patent application Ser. No. 9-121183 filed in Japan, the contents of which is hereby incorporated by reference.

BACKGROUND OF THE INVENTION

This invention relates to an image pickup apparatus or actuator device capable of automatically tracking an object, i.e., the so-called robot eye.

Figure 7:
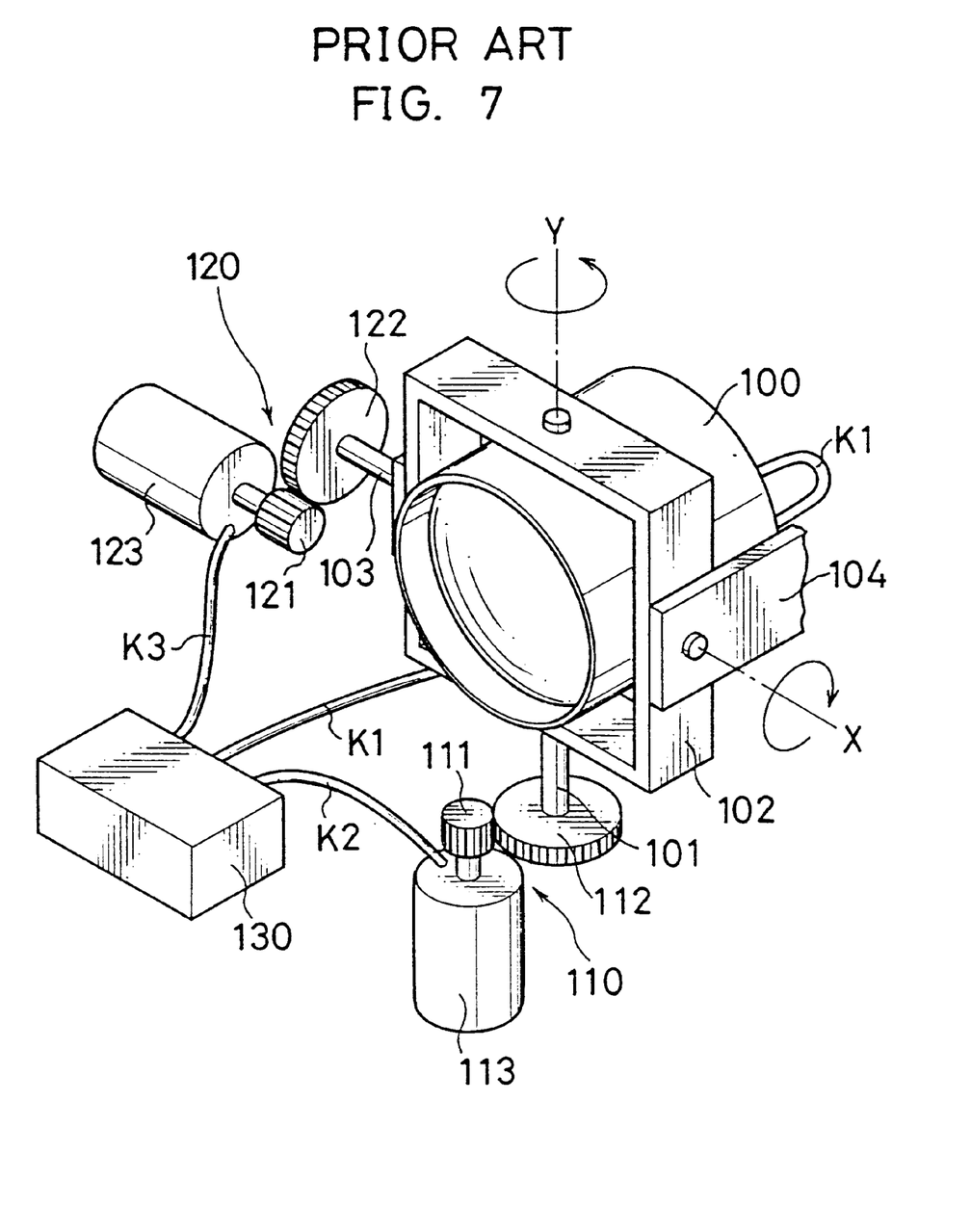
FIG. 7 is a perspective view showing a construction of a conventional image pickup apparatus.

The construction of a known image pickup apparatus using a gimbal is shown in FIG. 7. A sensing optical system and an image pickup device such as CCDs are contained in a generally cylindrical image pickup unit 100. The image pickup apparatus is connected with a control unit 130 via a cable K1. The image pickup unit 100 is supported on a rotary frame 102 by a shaft 101, and is rotatable about a Y-axis. The rotary frame 102 is supported on a fixed frame 104 by a shaft 103, and is rotatable about an X-axis. The X-axis is substantially horizontal and stationary. On the other hand, the Y-axis moves on a plane perpendicular to the X-axis.

A gear 112 is secured to the shaft 101 and engaged with a gear 111 which is fixed on a drive shaft of a motor. 113. A Y-axis moving mechanism 110 is constructed by the gears 111, 112, the motor 113, and an encoder (not shown), and adapted for controlling the rotation amount and the rotation direction of the shaft 101. The motor 113 and the encoder are connected with the control unit 130 via a cable K2.

Likewise, a gear 122 is secured to the shaft 103 and engaged with a gear 121 secured to a drive shaft of a motor 123. An X-axis moving mechanism 120 is constructed by the gears 121, 122, the motor 123, and an encoder (not shown), and adapted for controlling the rotation amount and the rotation direction of the shaft 131. The motor 123 and the encoder are connected with the control unit 130 via a cable K3.

In automatically tracking an object, the control unit 130, processes an image picked up by the image pickup unit 100, and separatingly extracts an image of the object. The control unit 130 calculates a necessary movement amount to move the image of the object to the center of a screen. Further, the control unit 130 drives the motor 113 and 123 based on a calculation result to orient the optical axis of the sensing optical system of the image pickup unit 100 toward the object.

In the construction of the conventional image pickup apparatus, at least the Y-axis moving mechanism 110 needs to be provided integrally with the rotary frame 102 or inside the image pickup unit 100. Accordingly, the X-axis moving mechanism 120 has to drive not only the image pickup unit 100 and the rotary frame 102, but also the Y-axis moving mechanism 110 together. This causes the problem that the X-axis moving mechanism 120 is subject to a larger load in comparison with the Y-axis moving mechanism 110.

Further, the space for the cables K1, K2 to connect the movable elements such as the image pickup unit 100 and the Y-axis moving mechanism 110 with the control unit 130 are required, consequently making it difficult to render the apparatus smaller and lighter.

Furthermore, in order to accomplish the dust-, humidity- and water-preventing purposes, it is necessary to contain the entire apparatus including not only the image pickup unit 100 but also the Y-axis moving mechanism 110 and the X-axis moving mechanism 120 in a special housing, making the construction of the apparatus disadvantageously more complicated and larger.

SUMMARY OF THE INVENTION

It is an object of the present invention to provide an image pickup apparatus or an actuator device which has overcome the problems residing in the prior art.

According to an aspect of the present invention, an image pickup apparatus comprises: an image pickup unit which includes an image sensor; a first magnetic member fixedly attached to the image pickup unit; a holder which movably holds the image pickup unit; a second magnetic member which magnetically attracts the first magnetic member; and a mover which moves the second magnetic member.

According to another aspect of the present invention, an image pickup apparatus comprises: an image pickup unit includes: a casing having a spherical outside surface and an opening; an image sensor provided inside of the casing; an optical system provided inside of the casing to focus an optical image passed through the opening onto the image sensor; a first magnetic member fixedly attached to the image pickup unit; a holder which movably holds the image pickup unit, the holder including a housing having a substantially spherical space to accommodate the image pickup unit, the housing being formed with a first opening facing the same direction as the opening of the image pickup unit, and a second opening; a second magnetic member which is provided in a position opposite to the holder and magnetically attracts the first magnetic member by a way of the second opening of the holder; and a mover which moves the second magnetic member.

According to another aspect of the present invention, an actuator device comprises: a movable body having a spherical outside surface; a holder which holds the movable body rotatably; a first magnetic member provided on the movable body; a second magnetic member which is provided in a position opposite to the movable body and magnetically attracts the first magnetic member; and a mover which moves the second magnetic member in a specified plane.

These and other objects, features and advantages of the present invention will become more apparent upon a reading of the following detailed description and accompanying drawings.

DETAILED DESCRIPTION OF THE PREFERRED EMBODIMENTS OF THE INVENTION

Figure 1:
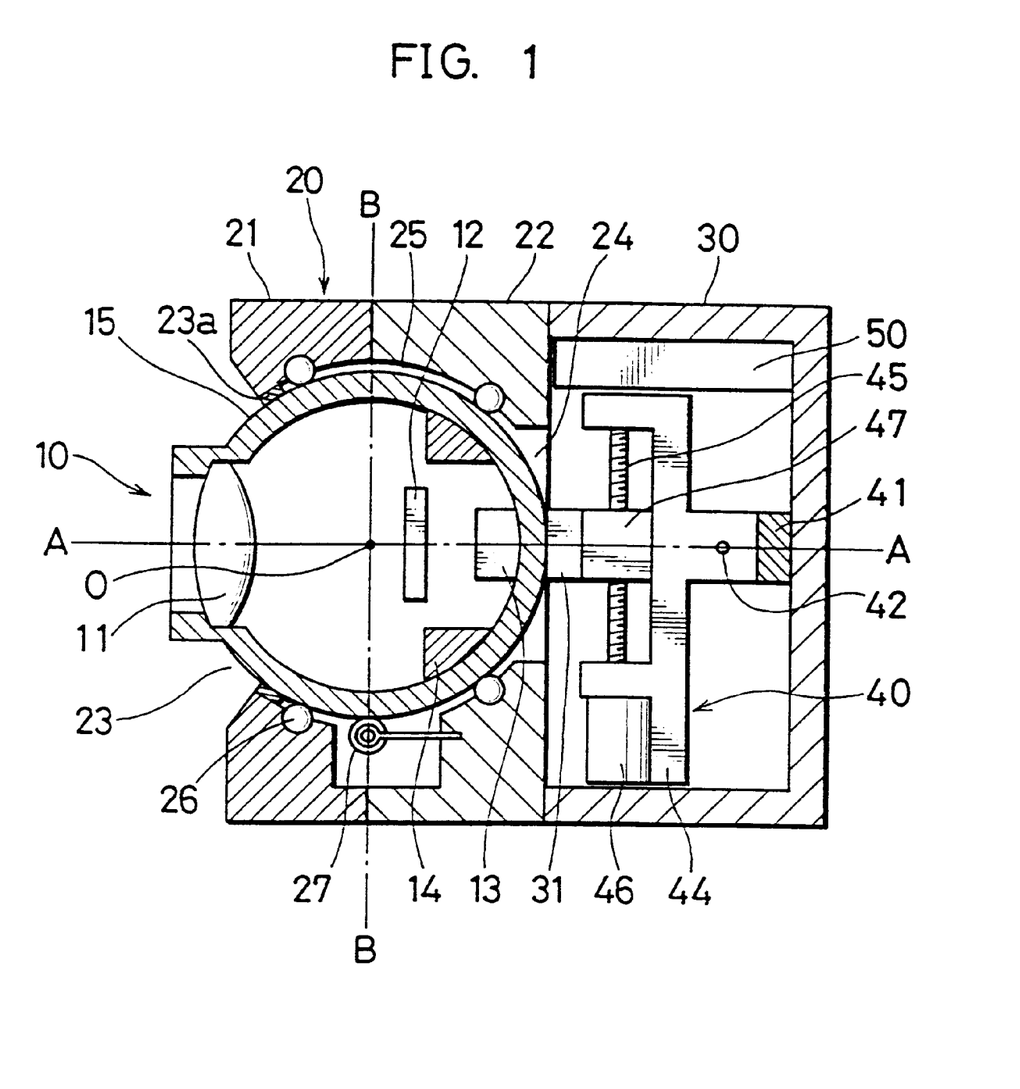
FIG. 1 is a view in section of an image pickup apparatus embodying the present invention, the image pickup apparatus being in an initial state.
Figure 2:
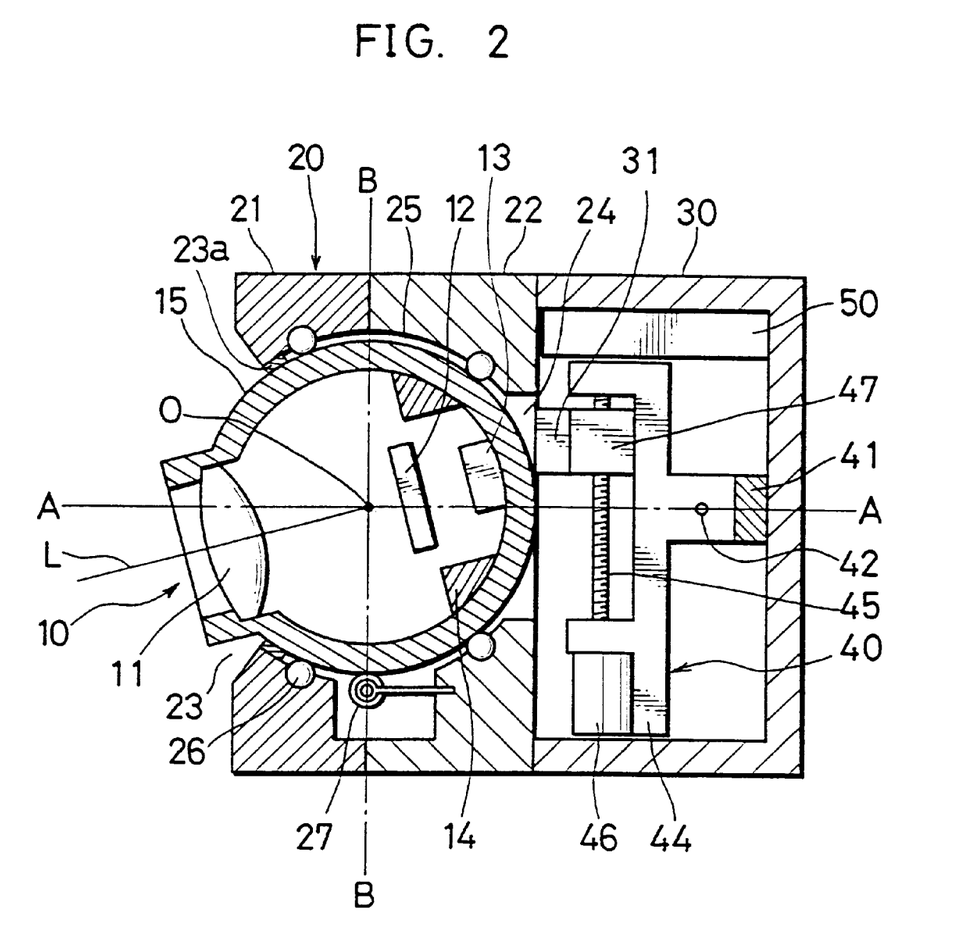
FIG. 2 is a view in section of the image pickup apparatus in a driven state.

FIGS. 1 and 2 are sectional views of an image pickup apparatus embodying the invention, in an initial state and in a driven state, respectively. It should be noted that this image pickup apparatus has a similar construction on a sectional plane passing the axis A—A in FIGS. 1 and 2.

As shown in FIGS. 1 and 2, at least a part of the outside surface of a casing of an image pickup unit 10 is spherical (or the image pickup unit 10 is substantially spherical), and is internally provided with a sensing optical system 11, an image pickup device or image sensor 12 including CCD (Charged Couple Device), a first magnetic member 13 including an iron piece or a permanent magnet, a balance weight 14. The sensing optical system 11 and the first magnetic member 13 are substantially symmetrically arranged with respect to a center O of the sphere.

A first housing 20 includes two sections 21, 22, and is formed with a substantially spherical internal space 25 for accommodating the image pickup unit 10. A first aperture 23 is formed in the front wall of the first housing 20, and a part of the sensing optical system 11 of the image pickup unit 10 projects outside through the first aperture 23. Further, a second aperture 24 is formed in the rear wall of the first housing 20. Between a concave spherical surface of the space 25 and an outside surface (convex spherical surface) 15 of the image pickup unit 10 are provided a plurality of balls 26 so as to rotatably hold the image pickup unit 10 about an axis passing the center O of this sphere. Since the balls 26 construct the so-called ball bearings, the substantially spherical outside surface of the image pickup unit 10 and the balls 26 are in point contact with each other and only a rolling friction acts therebetween when the image pickup unit 10 rotates. Thus, the image pickup unit 10 can rotate upon a very small force.

In a specified position (e.g., at the bottom) inside the first housing 20 and on a first plane (parallel with the plane of FIG. 1) including axes A—A, B—B, there is provided an encoder 27 which rotates about an axis perpendicular to the first plane and detects an angle of rotation (rotation amount) of the image pickup unit 10 on the first plane. Similarly, in a specified position (e.g., on the side) inside the first housing 20 and on a second plane including the axis A—A and perpendicular to the plane of FIG. 1, there is provided an encoder (not shown) which rotates about an axis perpendicular to the second plane and detects the angle of rotation (rotation amount) of the image pickup unit 10. Detection signals of the two encoders 27 are inputted to a control unit 50 to calculate the direction of the optical axis of the sensing optical system 11 of the image pickup unit 10.

Behind the first housing 20 is provided a second housing 30 in such a manner as to enclose the second aperture 24. Inside the second housing 30 are provided a two-dimensional moving mechanism 40, the control unit 50, etc. A second magnetic member 31 such as permanent magnet is secured to the two-dimensional moving mechanism 40. Further, the second magnetic member 31 faces the first magnetic member 13 via the second aperture 24 and the wall of the image pickup unit 10.

A sealing member 23a is provided between the outside surface 15 of the image pickup unit 10 and the first aperture 23 of the first housing 20 to prevent dust or the like from entering the inside of the first housing 20. Also, the first and second housings 20, 30 are tightly connected. Also, a portion of the sensing optical system 11 of the image pickup unit 10 is sealed. In this way, even in the case that the image pickup apparatus is installed in dusty environment, highly humid environment or environment which is likely to be exposed to water, dust, humidity or water can be assuredly prevented from coming into the holdings.

Figure 3:
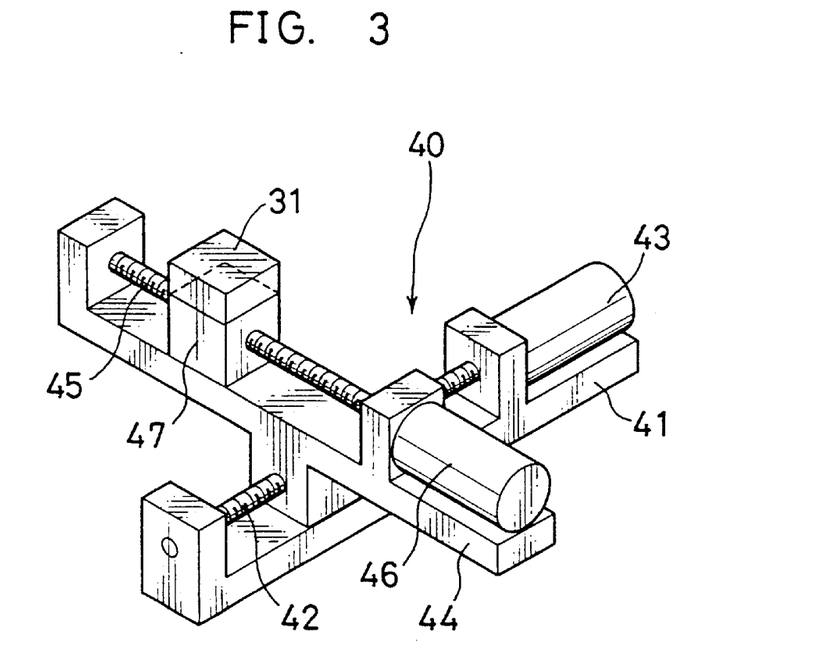
FIG. 3 is a perspective view showing a moving mechanism usable in the image pickup apparatus.

The detail of the two-dimensional moving mechanism 40 is shown in FIG. 3. This mechanism 40 includes first and second units which are reciprocatively moved in first and second directions perpendicular to each other. The first unit is comprised of a first table 41 secured to the second housing 30, a first threaded feed shaft 42 extending in the first direction (e.g., direction perpendicular to the plane of FIG. 1), a first motor 43 for drivingly rotating the first threaded feed shaft 42. The second unit is comprised of a second table 44 which is engaged with the first threaded feed shaft 42 by a threaded hole formed therein and reciprocatively driven in the first direction on the first table 41, a second threaded feed shaft 45 which is provided on the second table 44, and extends in the second direction (vertical direction in FIG. 1) perpendicular to the first threaded feed shaft 42, a second motor 46 for drivingly rotating the second threaded feed shaft 45, a movable block 47 which is engaged with the second threaded feed shaft 45 by a threaded hole formed therein and reciprocatively driven in the second direction. The second magnetic member 31 is secured to the movable block 47.

By driving the two-dimensional moving mechanism 40, the movable block 47 and the second magnetic member 31 secured thereto can be moved to a desired position in a plane perpendicular to the plane of FIG. 1. Since the first magnetic member 13 is attracted by the magnetic force of the second magnetic member 31, it follows the movement of the second magnetic member 31. As described above, the image pickup unit 10 is supported on the balls 26 and is permitted to easily rotate about an arbitrary axis passing the center O of the sphere. Accordingly, as shown in FIG. 2, the first magnetic member 13 secured to the inner surface of the wall of the image pickup unit 10 is rotated about the center O of the sphere as the second magnetic member 31 is moved and is finally positioned on a line connecting the center O and the second magnetic member 31. As a result, the optical axis L of the sensing optical system 11 of the image pickup unit 10 can be oriented in a specified direction so as to pick up an image in a desired direction.

Figure 4:
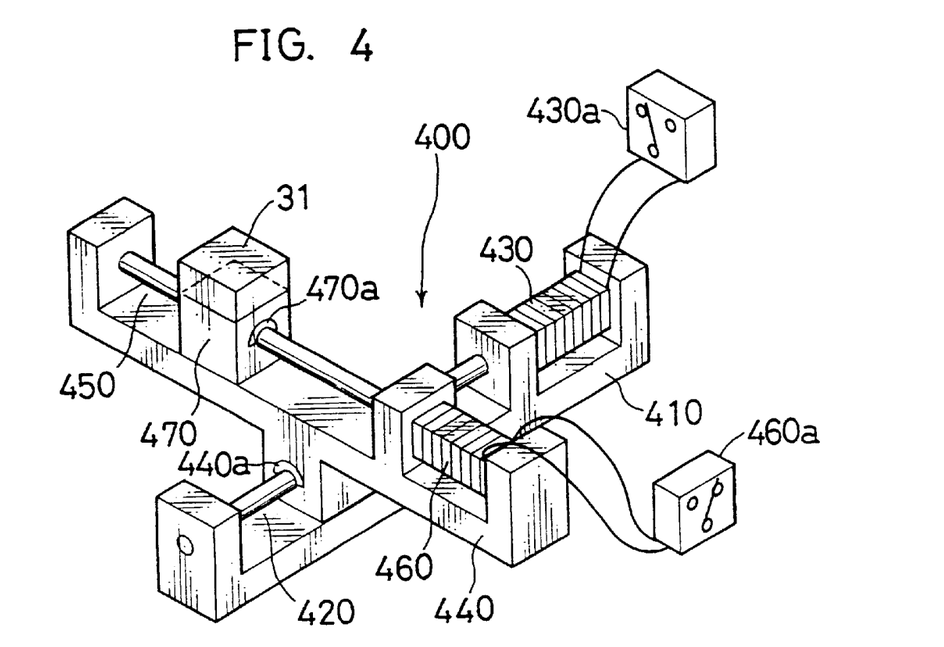
FIG. 4 is a perspective view showing another moving mechanism usable in the image pickup apparatus.

FIG. 4 shows another two-dimensional moving mechanism 400. This two-dimensional moving mechanism 400 uses piezo-electric elements instead of motors. Similarly to the two-dimensional moving mechanism 40, specifically, the two-dimensional moving mechanism 400 includes first and second units which are reciprocatively moved in first and second directions perpendicular to each other. The first unit is comprised of a first table 410 secured to the second housing 30, a first feed bar 420 extending in the first direction, a first piezo-electric driver 430 for reciprocatively moving the first feed bar 420 in the first direction. The second unit is comprised of a second table 440 which is mounted on the first feed bar 420 and reciprocatively driven in the first direction on the first table 410, a second feed bar 450 provided on the second table 440, and extends in the second direction (vertical direction in FIG. 1) perpendicular to the first feed bar 420, a second piezo-electric driver 460 for reciprocatively moving the second feed bar 450, a movable block 470 which is mounted on the second feed bar 450 and reciprocatively driven in the second direction. The second magnetic member 31 is secured to the movable block 470.

The second table 440 is engaged with the first feed bar 420 by way of a first friction member 440a. The movable block 470 is engaged with the second feed bar 450 by way of a second friction member 470a. The piezo-electric drivers 430 and 460 are connected to driving pulse generators 430a and 460a. Each driving pulse generator generates two different driving pulse signal, one having a waveform composed of a slowly rising leading edge followed by a rapidly falling trailing edge, and the other having a waveform composed of a rapidly rising leading edge followed by a slowly falling trailing edge. The first and second signals are switched over by a switch provide in the generator 430*a* (460*a*).

When the first driving pulse signal is generated, the first feed bar 420 (the second feed bar 450) is moved slowly in a forward direction in a first half of each pulse, the second table 440 mounted on the first feed bar 420 (the movable block 470 mounted on the second feed bar 450) is moved in the forward direction owing to a friction force between the first feed bar 420 and the first friction member 440*a* (a friction force between the second feed bar 450 and the second friction member 470*a*). However, in a second half of each pulse, the first feed bar 420 (the second feed bar 450) is rapidly moved in a rearward. Consequently, the second table 440 (the movable block 470) cannot move together with the first feed bar 420 (the second feed bar 450), and stay thereat. A specified number of driving pluses are generated to move the second table 440 (the movable block 470) a desired distance.

When the second driving pulse signal is generated, the second table 440 (the movable block 470) is moved a desired distance in the opposite direction or rearward direction to the first second driving pulse in a similar way. The reciprocative movement of an object using piezo-electric element, which has been described, is disclosed in more detail in U.S. Pat. No. 5,589,723.

Figure 5:
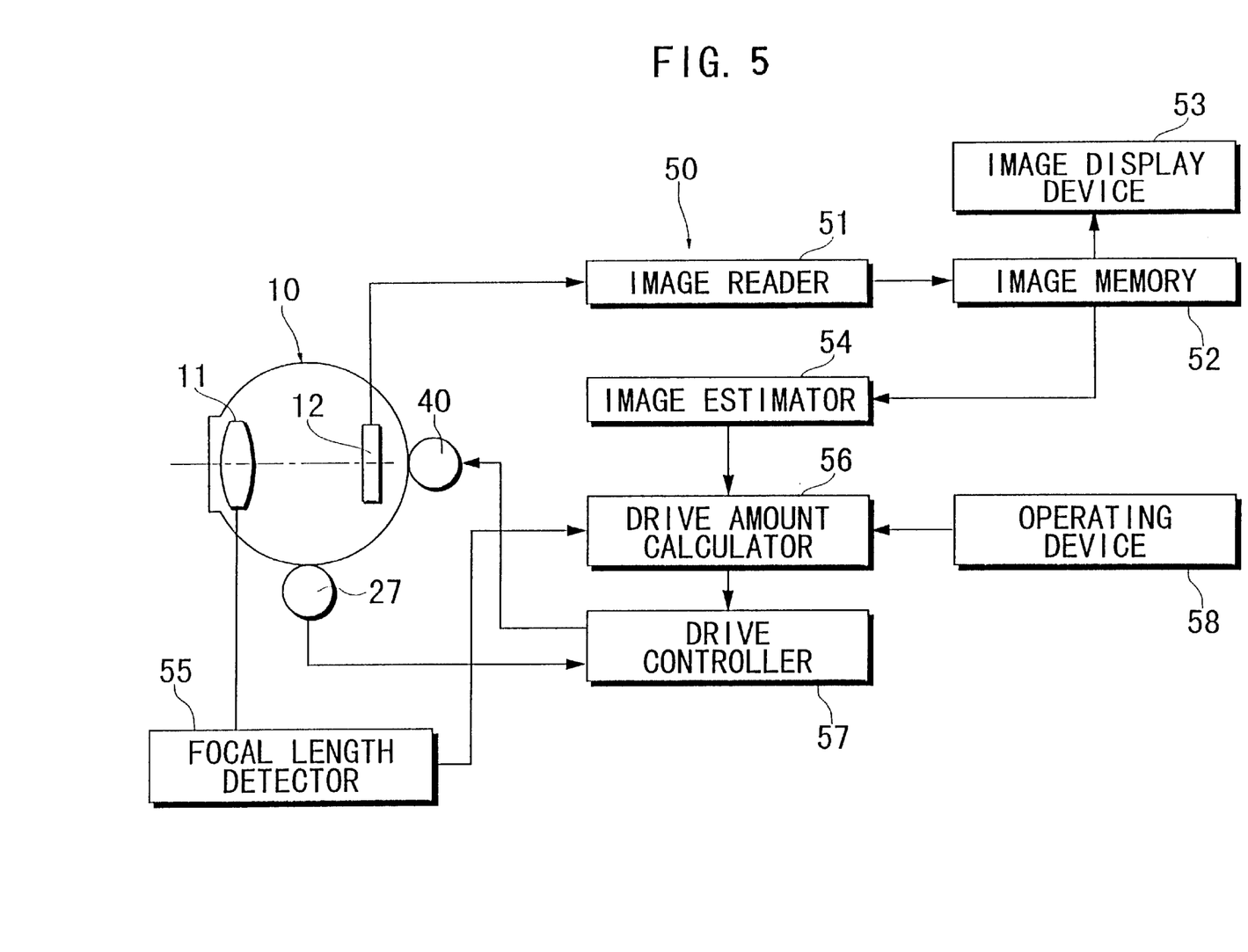
FIG. 5 is a block diagram showing a control unit of the image pickup apparatus.

A construction of the control unit 50 is shown in FIG. 5. The control unit 50 is constructed by a microcomputer, a memory, and other electronic devices. More specifically, the control unit 50 includes an image reader 51, an image memory 52, an image display device 53, an image estimator 54, a focal length detector 55, a drive amount calculator 56, a drive controller 57, a gaze operating device 58, and the like. The image reader 51 converts an image signal (analog signal) from the solidstate image pickup device 12 into image data (digital signal) to admit the image into the control unit 50. The image memory 52 stores the A/D converted image data. The image display device 53 converts the digital image data stored in the image memory 52 into an analog signal, e.g., an NTSC signal and outputs it to a monitor TV or the like. The image estimator 54 processes image data stored in the image memory 52 when the target is automatically tracked and separatingly extracts image data of the target. The focal length detector 55 detects a focal length of a lens in the case that the sensing optical system 11 of the image pickup unit 10 is a zoom lens. The drive amount calculator 56 calculates a necessary drive amount to move the image of the object to the center of the screen based on image data of the target separatingly extracted by the image estimator 54 and the focal length data of the sensing optical system 11 detected by the focal length detector 55. The drive controller 57 controls the two-dimensional moving mechanism 40 in accordance with the drive amount calculated by the drive amount calculator 56 and the detection signal of the encoder 27. The gaze operating device 58 allows an operator to manually control the gaze of the image pickup unit 10, i.e., the direction of the optical axis L of the sensing optical system 11 while viewing the monitor TV.

Figure 6:
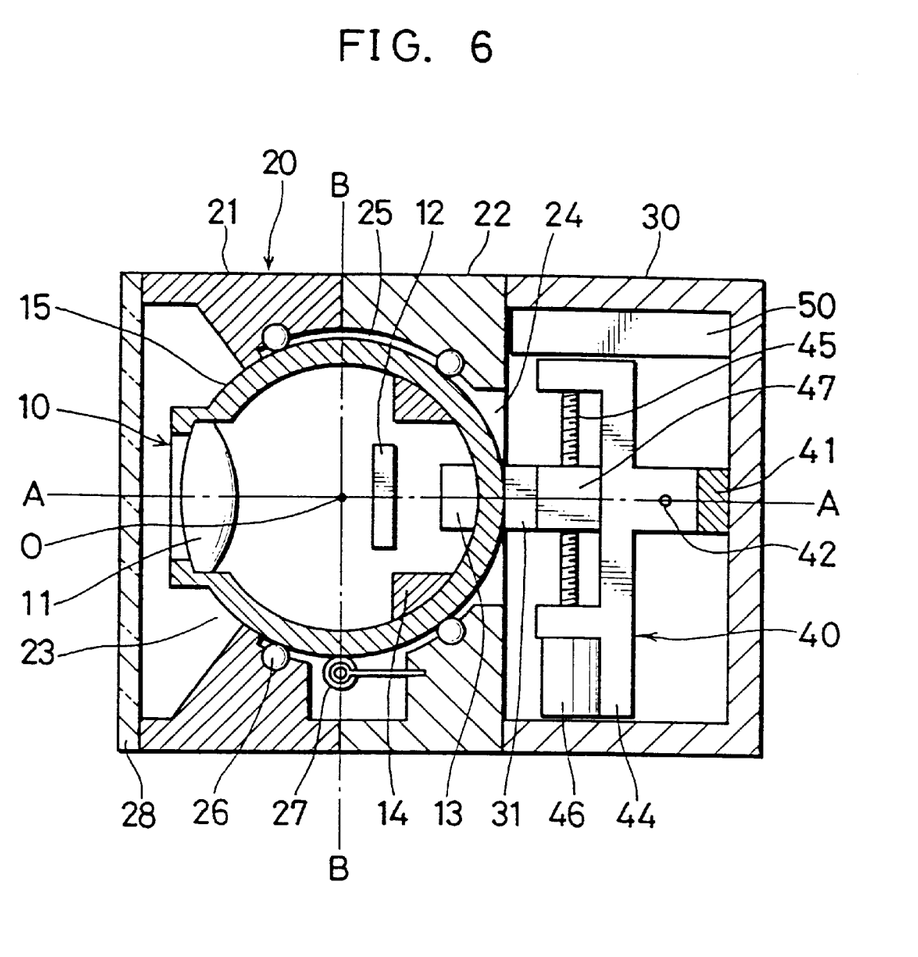
FIG. 6 is a view in section of another image pickup apparatus embodying the present invention.

The construction of another image pickup apparatus according to the invention is shown in FIG. 6. In the construction shown in FIG. 6, the front surface of the first aperture 23 of the first housing 20 is sealed by a transparent member 28. No description is given on the other portions since they are substantially the same as those of the image pickup apparatus shown in FIG. 1. In this case, the first housing 20, the second housing 30 and the transparent member 28 substantially construct a sealed casing. Accordingly, a portion of the sensing optical system 11 of the image pickup unit 10 needs not necessarily to be sealed.

Although the first magnetic member 13 is an iron piece or permanent magnet and the second magnetic m ember 31 is a permanent magnet in the foregoing embodiment, they are not limited to these. It is sufficient that at least one of the first and second magnetic members 13, 31 be a magnet. Further, the magnet used is not limited to a permanent magnet, but may be an electromagnet. Further, the first magnetic member 13 needs not be provided inside the image pickup unit 10. A platelike magnetic member may be adhered to the outside of the image pickup unit 10.

Although the two-dimensional moving mechanism 40 uses the treaded shafts, it is not limited to treaded shafts. For example, belts or chains may be used instead of threaded shafts. Further, the second magnetic member 31 may be directly moved using a linear motor. Although the two-dimensional moving mechanism 40 is of the so-called XY system in which two reciprocative units are arranged perpendicular to each other, it may be of the so-called (r, θ) system in which a single reciprocative unit is rotated about a specified axis.

As described above, an image pickup apparatus according to the invention contains at least a sensing optical system and an image pickup device inside and is provided with a substantially spherical image pickup unit provided with a first magnetic member near its outside surface, a holder for rotatably holding the image pickup unit about an arbitrary point, a second magnetic member which faces the first magnetic member of the image pickup unit and attracts the first magnetic member, and a moving mechanism for moving the second magnetic member. Accordingly, by moving the second magnetic member to a desired position by controlling the moving mechanism, the first magnetic member follows the movement of the second magnetic member by the magnetic attraction between the first and second magnetic members. Since the first magnetic member is provided inside the substantially spherical image pickup unit and the image pickup unit is rotatably held about an arbitrary point, the image pickup unit itself can be caused to rotate in a specified direction as the first magnetic member is moved.

Since no moving mechanism including a motor and a gear to cause the image pickup unit to rotate is provided in the image pickup unit as a movable element, the image pickup unit itself can be made smaller and lighter. Further, cable for controlling the moving mechanism is not required.

Since the image pickup unit is small and lightweight, attraction (magnetic force) acting between the first and second magnetic members which is necessary to cause the image pickup unit to rotate can be small, with the result that the first and second magnetic members can be small. With the smaller second magnetic member, the torque of the moving mechanism necessary to move the second magnetic member in a plane can be made smaller. As a result, there can be obtained an image pickup apparatus which is simply constructed, small and lightweight and can be driven with a small drive force.

By causing the center of gravity of the image pickup unit to substantially coincide with the center of the sphere, the image pickup unit can smoothly rotate upon a small drive force, i.e., the magnetic attraction acting on the first magnetic member. Further, by providing the first magnetic member in a position substantially symmetric to the sensing optical system with respect to the center of the sphere, the center of gravity of the image pickup unit can be easily adjusted.

By constructing the moving mechanism by the first unit reciprocatively movable in the first direction and the second unit reciprocatively movable in the second direction perpendicular to the first direction, using a permanent magnet as the second magnetic member and securing it to a movable portion of the second unit, it is not necessary to connect the cable with the movable portion of the second unit and a space necessary for the processing of the cable is not required. Further, the reliability of the apparatus can be improved by constructing the moving mechanism by a known part such as a motor, threaded shafts, belts, or chains.

Further, the image pickup unit is contained in the first housing, and the first housing is at least formed with the first aperture for picking up an image of an object by the sensing optical system, the second aperture for causing the first and second magnetic members to face each other via the casing wall of the image pickup unit and the substantially spherical inside surface facing the substantially spherical outside surface of the image pickup unit. Accordingly, the substantially spherical outside surface (convex surface) of the image pickup unit is held by the concave spherical surface having a substantially equal diameter, and the image pickup unit can rotate about an arbitrary axis passing the center of the sphere.

By constructing the holder by balls provided between the substantially spherical outside surface of the image pickup unit and the substantially spherical inside surface of the first housing, a load which acts when the image pickup unit is caused to rotate can be made considerably smaller. As a result, the image pickup unit can easily follow the movement of the second magnetic member.

Further, the image pickup unit can be substantially sealed inside the first housing by providing a sealing member in a clearance between the first aperture of the first housing and the outside surface of the image pickup unit or by sealing the first aperture of the first housing by the transparent member. Accordingly, dust-, humidity- or water-preventing effect can be obtained without using a special housing.

Furthermore, by providing the moving mechanism inside the second housing which is so provided as to enclose the second aperture of the first housing, the first and second housings can substantially construct a sealed housing for the image pickup apparatus. This enables the entire image pickup apparatus to be smaller and lighter.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. An image pickup apparatus comprising:
   an image pickup unit which includes an image sensor;
   a first magnetic member fixedly attached to the image pickup unit;
   a holder which movably holds the image pickup unit;
   a second magnetic member which magnetically attracts the first magnetic member; and
   a mover which moves the second magnetic member.

2. An image pickup apparatus according to claim 1, wherein the image pickup unit is rotatable about a specified point.

3. An image pickup apparatus according to claim 2, wherein the image pickup unit includes a casing having a spherical outside surface, and the image sensor is provided inside of the casing.

4. An image pickup apparatus according to claim 3, wherein the image pickup unit further includes an optical system inside of the casing to focus an optical image onto the image sensor.

5. An image pickup apparatus according to claim 4, wherein the first magnetic member is attached at a position symmetric to the optical system with respect to the specified point.

6. An image pickup apparatus according to claim 2, wherein the image pickup unit includes a casing having a spherical outside surface, and the holder includes a housing having a substantially spherical space to accommodate the image pickup unit, and a ball bearing coming into contact with the spherical outside surface of the casing.

7. An image pickup apparatus according to claim 2, wherein the specified point of the image pickup unit coincides with the center of gravity of the image pickup unit.

8. An image pickup apparatus according to claim 1, wherein the mover includes a moving mechanism which moves the second magnetic member on a plane opposite to the image pickup unit.

9. An image pickup apparatus according to claim 8, wherein the moving mechanism includes:
   a first moving unit which supports and moves the second magnetic member in a first direction; and
   a second moving unit which supports and moves the first moving unit in a second direction perpendicularly intersecting the first direction.

10. An image pickup apparatus according to claim 9, wherein the first moving unit includes:
    a first threaded feed shaft engaged with the second magnetic member; and
    a motor which drives the first threaded feed shaft to move the second magnetic member in the first direction;
    the second moving unit includes:
    a second threaded feed shaft engaged with the first moving unit; and
    a motor which drives the second threaded feed shaft to move the first moving unit in the second direction.

11. An image pickup apparatus according to claim 9, wherein the first moving unit includes:
    a first feed bar engaged with the second magnetic member; and
    a piezo-electric driver which moves the first feed bar reciprocatively to move the second magnetic member in the first direction;
    the second moving unit includes:
    a second feed bar engaged with the first moving unit; and
    a piezo-electric driver which moves the second feed bar reciprocatively to move the first moving unit in the second direction.

12. An image pickup apparatus comprising:
    an image pickup unit includes:
    a casing having a spherical outside surface and an opening;
    an image sensor provided inside of the casing;
    an optical system provided inside of the casing to focus an optical image passed through the opening onto the image sensor;
    a first magnetic member fixedly attached to the image pickup unit;

a holder which movably holds the image pickup unit, the holder including a housing having a substantially spherical space to accommodate the image pickup unit, the housing being formed with a first opening facing the same direction as the opening of the image pickup unit, and a second opening a second magnetic member which is provided in a position opposite to the holder and magnetically attracts the first magnetic member by a way of the second opening of the holder; and a mover which moves the second magnetic member.

13. An image pickup apparatus according to claim 12, wherein the holder further includes a ball bearing coming into contact with the spherical outside surface of the casing of the image pickup unit.

14. An image pickup apparatus according to claim 12, further comprising a sealing member between the first opening of the holder and the spherical outside surface of the casing of the image pickup unit.

15. An image pickup apparatus according to claim 12, further comprising a transparent member which closes the first opening of the holder.

16. An image pickup apparatus according to claim 12, further comprising an enclosure which encloses the second opening of the holder and supports the mover.

17. An actuator device comprising:

a movable body having a spherical outside surface;

a holder which holds the movable body rotatably;

a first magnetic member provided on the movable body;

a second magnetic member which is provided in a position opposite to the movable body and magnetically attracts the first magnetic member; and a mover which moves the second magnetic member in a specified plane.

18. An actuator device according to claim 17, wherein the movable body is in the form of a ball having a space inside thereof.

19. An actuator device according to claim 18, wherein the movable body includes an image pickup member in the inside space.

* * * * *